Nov. 27, 1934.   F. G. LOGAN   1,981,921
ELECTRIC CONTROLLING APPARATUS
Filed Aug. 10, 1932

INVENTOR
Frank G. Logan
BY
Lawrence K. Sager
his ATTORNEY

Patented Nov. 27, 1934

1,981,921

UNITED STATES PATENT OFFICE 1,981,921

ELECTRIC CONTROLLING APPARATUS

Frank G. Logan, Mount Vernon, N. Y., assignor to Ward Leonard Electric Company, a corporation of New York Application August 10, 1932, Serial No. 628,135

29 Claims. (Cl. 171—242)

This invention particularly relates to an improved method and improved apparatus for changing the voltage and current of a consumption circuit where an alternating current source is utilized; and is especially applicable to the control of lighting circuits for changing the brilliancy of the lamps from a maximum to a minimum.

It has been customary to use a reactor for changing the voltage and current of a consumption circuit where an alternating current source is used, by providing the reactor with a winding in series with the load and adjusting the reactance of the winding by change of direct current passing through another winding on the reactor. This requires an auxiliary direct current source for exciting the direct current winding on the reactor.

The main object of the present invention is to provide simple and inexpensive controlling apparatus wherein the energy from an alternating current source may be utilized and controlled for changing the reactance of the main winding of the reactor and by the use of simple and inexpensive controlling means. Another object of the invention is to permit the use of apparatus which requires little or no attention and which will be durable under long continued use. Another object is to provide a form of controlling means which will permit the use of a comparatively small adjustable controlling current compared to the energy controlled and which will permit the controlling means to be conveniently operated at any desired point remote from the main apparatus and with simplicity of wiring connections. Another object is to provide apparatus which will avoid large heat losses and secure efficient operation under the different load conditions. Other objects and advantages of this invention will be understood by those skilled in the art from the following description and accompanying drawing.

Figure 1:
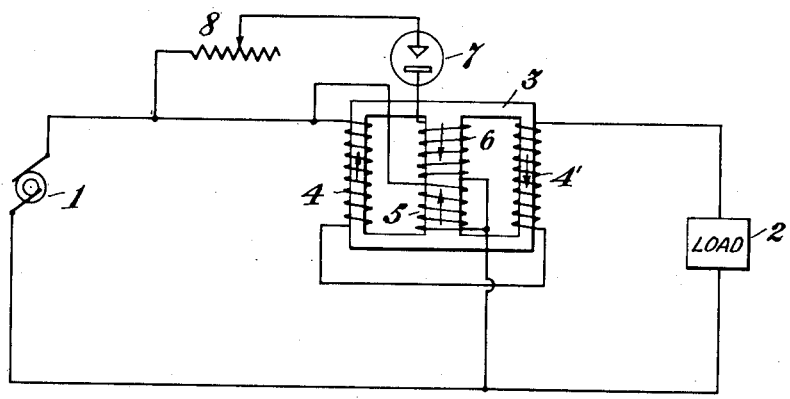
Figure 2:
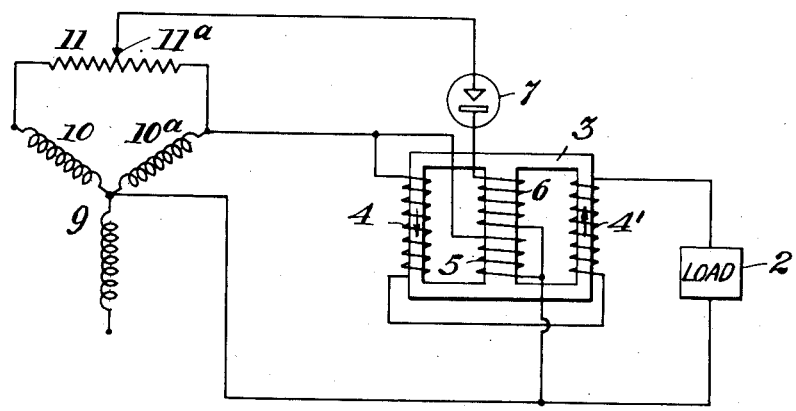

Fig. 1 is a diagram illustrating one embodiment of the invention; and Fig. 2 is a diagram showing another embodiment wherein the control is dependent upon shifting the phase of the controlling current.

Referring to Fig. 1 an alternating current source 1 is shown supplying current to a load 2 which may be a lamp load, a power load, or may be the controlling coil of some other apparatus wherein it is desired to change the voltage applied thereto. A reactor for controlling the voltage and current in the consumption circuit is shown having a laminated core 3. The core shown is of the three-legged type having cross- pieces joining their ends, but the particular form of this core may be varied provided the proper relationship of the magnetic flux therein is secured. The two outer legs of the core are shown embraced by a winding having portions 4, 4' which are connected in series and in series with the load across the alternating current source. An alternating current exciting winding 5 of comparatively high inductive reactance is shown embracing the middle leg of the core and is connected in a circuit across the alternating current supply lines. The middle leg of the core is also embraced by a winding 6 of high inductive reactance. This winding is supplied with pulsating unidirectional current derived from the alternating current source through a half wave rectifier 7, an adjustable resistance or rheostat 8 being shown in series with the rectifier 7 and the exciting coil 6 across the alternating current source for the purpose of adjusting, as may be desired, the value of the current passing through the controlling coil 6. The winding 4, 4' and the load could be supplied, if desired, from a separate source from that of the windings 5 and 6.

In general, the controlling effect is obtained by change of the total magnetic flux of the core due to change of the value of the current in the controlling winding 6 and alternating current exciting winding 5. It will be understood that the winding portions 4, 4' are connected so that the flux due to them is in the same direction in the outside path of the core, as indicated by the arrows on the drawing. Thus the control leg portion of the core does not form a path for the flux created by these windings but is a magnetic shunt path with relation to the outside legs of the core. In this form of core and winding relationship and in various other modifications that may be made, the magnetizing windings have substantially no current induced in them by the action of the alternating current load carrying winding. Owing to the fact that the winding 5 is excited by alternating current from the same alternating current source that the winding 6 derives its energy, it will be appreciated that the pulsations of the current through the winding 6 in one direction have the same frequency as the pulsations of a half-wave of the alternating current supplied to the winding 5. The connections of the windings 6 and 5 should be made such that the flux due to the pulsating current in the winding 6 will oppose that due to the winding 5 during each half-cycle. In carrying this invention into effect, the best results are obtained when the winding 6 bucks the winding 5, as indicated by the arrows on the middle leg, instead of being additive. It will be understood that the windings 5 and 6 may be relatively proportioned to give the desired results and the phase relationship of voltage, current and flux of each of the windings may be displaced somewhat with reference to such corresponding factors of the other winding, but it has been found that the best results are obtained when the winding 6 acts in substantial opposition to half-waves of the winding 5 for maximum flux conditions.

When the resistance or impedance 8 is adjusted at the controlling location to have a high value and thereby reduce the value of the current passing through the rectifier and through the winding 6, the controlling coils 6 and 5 will have their lowest effect in controlling the flux of the core, the winding 4, 4' will then have its maximum reactance with maximum counter electromotive force therein, resulting in a minimum voltage being applied to the load and causing the minimum current to pass in the consumption circuit. As the resistance or impedance of the device 8 is reduced, more and more current will pass through the rectifier and through the winding 6 and result, by reason of its inter-relation with the winding 5, in providing more and more saturating flux in the core 3, until when the full current is passed through the rectifier 7 and the winding 6, the core is brought to its highest condition of saturation. This reduces the reactance of the winding 4, 4' to a minimum, resulting in the load receiving its maximum value of voltage and current.

Instead of changing the voltage and current in the winding 6 for obtaining the desired controlling effects, the value of the voltage and current of the consumption circuit may be changed as desired by shifting the phase of the voltage, current and flux of the winding 6 with reference respectively to the voltage, current and flux of the winding 5. Such an embodiment of the invention is shown in Fig. 2 wherein similarly numbered parts correspond to those already described with reference to Fig. 1. Any suitable controlling apparatus may be used for securing the shifting of phase relationship or any form of phase shifter, but for convenient showing and understanding of this embodiment of the invention, the source 9 in Fig. 2 is shown as a three-phase source having star connected windings. Between the terminals of the phase windings 10 and 10a of the source is connected a potentiometer 11 having a movable contact 11a. This contact is connected to the anode of the half-wave rectifier 7. The alternating current winding 5 is connected across one of the two phase windings mentioned, being shown connected across the phase winding 10a. The consumption circuit and the winding 4, 4' in series therewith are also shown connected across the phase winding 10a, but this circuit could be connected across other phases of the source or to some other alternating current source if desired, the essential requirement being provision of means whereby the phase of the flux due to the winding 6 may be shifted with reference to that of the winding 5.

It will be evident that when the contact 11a of the potentiometer is moved to the extreme right, the phase of the pulsating flux due to the winding 6 will be approximately in phase with the half-wave fluxes due to the winding 5 assuming the connections of the windings are such as to give this cumulative effect. When the contact 11a is moved along the potentiometer to the left, the phase of the flux due to winding 6 becomes more and more displaced with reference to the phase of the flux due to the half-waves in winding 5, thus affording means for obtaining the desired change in phase relationship. When the contact 11a is at the extreme right to bring the flux of windings 6 and 5 approximately in phase during half-wave periods, the reactance of the winding 4, 4' is at a maximum value giving low voltage and current in the consumption circuit. When the contact 11a is moved to the left to gradually increase the phase displacement, the reactance of the winding 4, 4' is reduced with increase of saturating flux in the core, giving a gradually increasing voltage and current in the load circuit.

It will be understood that this invention may be embodied in various forms and types of apparatus and that various modifications may be made without departing from the scope of the invention, the particular apparatus indicated in the drawing being representative examples of the invention.

I claim:

1. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding.

2. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, and means for adjusting the value of the current in one of said last two named windings.

3. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, and means for adjusting the value of said pulsating current.

4. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, the flux due to said third winding being in opposition to the flux of the half-waves due to said second winding.

5. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, the flux due to said third winding being in opposition to the flux due to the half-waves of said second winding, and means for adjusting the value of the current in one of said last two named windings.

6. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, the flux due to said third winding being in opposition to the flux due to the half-waves of said second winding, and means for adjusting the value of said pulsating current.

7. The combination of an alternating current source, a consumption circuit, a reactor core, a winding on said core connected in series between said source and the consumption circuit, a winding on a portion of the core supplied with alternating current, said portion of the core being in shunt to the normal path of the flux due to said first named winding, and a winding on said portion of the core supplied with a uni-directional pulsating current of the same frequency as the half-waves of the alternating current supplying said second named winding, and means for shifting the phase of the current in one of said last two named windings with reference to that in the other of said last named two windings.

8. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, and an additional winding on said portion of the core supplied with current from said rectifier, the frequency of the uni-directional pulsating current from said rectifier to said last named winding being the same as the half-waves of the alternating current supplying said second winding.

9. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, an additional winding on said portion of the core supplied with current from said rectifier, the frequency of the uni-directional pulsating current from said rectifier to said last named winding being the same as the half-waves of the alternating current supplying said second winding, and means for adjusting the value of the current in one of said last two named windings.

10. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, an additional winding on said portion of the core supplied with current from said rectifier, the frequency of the uni-directional pulsating current from said rectifier to said last named winding being the same as the half-waves of the alternating current supplying said second winding, and means for adjusting the value of the current delivered to said additional winding.

11. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, and an additional winding on said portion of the core supplied with current from said rectifier, the frequency of the uni-directional pulsating current from said rectifier to said last named winding being the same as the half-waves of the alternating current supplying said second winding, the flux due to said additional winding being in opposition to the flux due to said second winding.

12. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, an additional winding on said portion of the core supplied with current from said rectifier, the frequency of the uni-directional pulsating current from said rectifier to said last named winding being the same as the half-waves of the alternating current supplying said second winding, the flux due to said additional winding being in opposition to the flux due to said second winding, and means for adjusting the value of the current in one of said last two named windings.

13. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, an additional winding on said portion of the core supplied with current from said rectifier, the frequency of the uni-directional pulsating current from said rectifier to said last named winding being the same as the half-waves of the alternating current supplying said second winding, the flux due to said additional winding being in opposition to the flux due to said second winding, and means for adjusting the value of the current delivered to said additional winding.

14. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, an additional winding on said portion of the core supplied with current from said rectifier, the frequency of the uni-directional pulsating current from said rectifier to said last named winding being the same as the half-waves of the alternating current supplying said second winding, and means for shifting the phase of the current in one of said last two named windings with reference to that in the other of said last two named windings.

15. The combination of an alternating current source, a consumption circuit, a reactor core, a winding on said core connected in series between said source and the consumption circuit, a second winding on a portion of the core supplied with alternating current, said portion of the core being in shunt to the normal path of the flux due to said first named winding, a half-wave rectifier, and an additional winding on said portion of the core supplied with current from said rectifier, said second winding and said rectifier being supplied with energy derived from the same alternating current source.

16. The combination of an alternating current source, a consumption circuit, a reactor core, a winding on said core connected in series between said source and the consumption circuit, a magnetizing winding on said core supplied with alternating current, a second magnetizing winding on said core, and means for supplying said second magnetizing winding with a uni-directional pulsating current of the same frequency as the half-waves of the alternating current supplying said first named magnetizing winding, said magnetizing windings being related on said core to said first named winding as to be substantially free from induced currents caused to flow therein from the action of the first named winding, said first named winding being subjected to the magnetizing effects of said magnetizing windings.

17. The combination of an alternating current source, a consumption circuit, a reactor core, a winding on said core connected in series between said source and the consumption circuit, a magnetizing winding on said core supplied with alternating current, a second magnetizing winding on said core, means for supplying said second magnetizing winding with a uni-directional pulsating current of the same frequency as the half-waves of the alternating current supplying said first named magnetizing winding, said magnetizing windings being related on said core to said first named winding as to be substantially free from induced currents caused to flow therein from the action of the first named winding, said first named winding being subjected to the magnetizing effects of said magnetizing windings, and means for adjusting the value of the current in one of said two magnetizing windings.

18. The combination of an alternating current source, a consumption circuit, a reactor core, a winding on said core connected in series between said source and the consumption circuit, a magnetizing winding on said core supplied with alternating current, a second magnetizing winding on said core, and means for supplying said second magnetizing winding with a uni-directional pulsating current of the same frequency as the half-waves of the alternating current supplying said first named magnetizing winding, said magnetizing windings being related on said core to said first named winding as to be substantially free from induced currents caused to flow therein from the action of the first named winding, said first named winding being subjected to the magnetizing effects of said magnetizing windings, the flux due to said second magnetizing winding being in opposition to the flux of the half-waves due to said first magnetizing winding.

19. The combination of an alternating current source, a consumption circuit, a reactor core, a winding on said core connected in series between said source and the consumption circuit, a magnetizing winding on said core supplied with alternating current, a second magnetizing winding on said core, means for supplying said second magnetizing winding with a uni-directional pulsating current of the same frequency as the half-waves of the alternating current supplying said first named magnetizing winding, said magnetizing windings being related on said core to said first named winding as to be substantially free from induced currents caused to flow therein from the action of the first named winding, said first named winding being subjected to the magnetizing effects of said magnetizing windings, the flux due to said second magnetizing winding being in opposition to the flux of the half-waves due to said first magnetizing winding, and means for adjusting the value of the current in one of said magnetizing windings.

20. The combination of an alternating current source, a consumption circuit, a reactor core, a winding on said core connected in series between said source and the consumption circuit, a magnetizing winding on said core supplied with alternating current, a second magnetizing winding on said core, means for supplying said second magnetizing winding with a uni-directional pulsating current of the same frequency as the half-waves of the alternating current supplying said first named magnetizing winding, said magnetizing windings being related on said core to said first named winding as to be substantially free from induced currents caused to flow therein from the action of the first named winding, said first named winding being subjected to the magnetizing effects of said magnetizing windings, and means for shifting the phase of the current in one of said magnetizing windings with reference to that in the other of said magnetizing windings.

21. The combination of an alternating current source, a consumption circuit, a reactor core, a winding on said core connected in series between said source and the consumption circuit, a magnetizing winding on said core supplied with alternating current, a second magnetizing winding on said core, and a half-wave rectifier for supplying said second magnetizing winding with a uni-directional pulsating current of the same frequency as the half waves of the alternating current supplying said first named magnetizing winding.

22. The combination of an alternating current source, a consumption circuit, a reactor core, a winding on said core connected in series between said source and the consumption circuit, a magnetizing winding on said core supplied with alternating current, a second magnetizing winding on said core, a half-wave rectifier for supplying said second magnetizing winding with a uni-directional pulsating current of the same frequency as the half-waves of the alternating current supplying said first named magnetizing winding, and means for adjusting the value of the current in one of said magnetizing windings.

23. The combination of an alternating current source, a consumption circuit, a reactor core, a winding on said core connected in series between said source and the consumption circuit, a magnetizing winding on said core supplied with alternating current, a second magnetizing winding on said core, and a half-wave rectifier for supplying said second magnetizing winding with a uni-directional pulsating current of the same frequency as the half-waves of the alternating current supplying said first named magnetizing winding, the flux due to said second magnetizing winding being in opposition to the flux due to said first named magnetizing winding.

24. The combination of an alternating current source, a consumption circuit, a reactor core, a winding on said core connected in series between said source and the consumption circuit, a magnetizing winding on said core supplied with alternating current, a second magnetizing winding on said core, a half-wave rectifier for supplying said second magnetizing winding with a uni-directional pulsating current of the same frequency as the half-waves of the alternating current supplying said first named magnetizing winding, the flux due to said second magnetizing winding being in opposition to the flux due to said first named magnetizing winding, and means for adjusting the value of the current in one of said magnetizing windings.

25. The combination of an alternating current source, a consumption circuit, a reactor core, a winding on said core connected in series between said source and the consumption circuit, a magnetizing winding on said core supplied with alternating current, a second magnetizing winding on said core, a half-wave rectifier for supplying said second magnetizing winding with a uni-directional pulsating current of the same frequency as the half-waves of the alternating current supplying said first named magnetizing winding, and means for shifting the phase of the current in one of said magnetizing windings with reference to that in the other of said magnetizing windings.

26. The combination of a source of alternating current, a reactor core, a magnetizing winding on said core supplied with alternating current from said source, a second magnetizing winding on said core, means for supplying to said second magnetizing winding a uni-directional pulsating current of the same frequency as the half-waves of the alternating current supplying said first named winding, and a consumption circuit subjected to the joint effect of said windings.

27. The combination of a source of alternating current, a reactor core, a magnetizing winding on said core supplied with alternating current from said source, a second magnetizing winding on said core, means for supplying to said second magnetizing winding a uni-directional pulsating current of the same frequency as the half-waves of the alternating current supplying said first named winding, means for relatively adjusting the currents in said windings, and a consumption circuit subjected to the joint effect of said windings.

28. The combination of a source of alternating current, a reactor core, a magnetizing winding on said core supplied with alternating current from said source, a second magnetizing winding on said core, means for supplying to said second magnetizing winding a uni-directional pulsating current of the same frequency as the half-waves of the alternating current supplying said first named winding, means for adjusting the time phase of the currents in said windings relatively with respect to each other, and a consumption circuit subjected to the joint effect of said windings.

29. The combination of a source of alternating current, a reactor core, a magnetizing winding on said core supplied with alternating current from said source, a second magnetizing winding on said core, means for supplying to said second magnetizing winding a uni-directional pulsating current of the same frequency as the half-waves of the alternating current supplying said first named winding, means for adjusting in value the relative amplitude of the currents in said windings, and a consumption circuit subjected to the joint effect of said windings.

FRANK G. LOGAN.